US011248423B2

(12) United States Patent
Finke et al.

(10) Patent No.: US 11,248,423 B2
(45) Date of Patent: Feb. 15, 2022

(54) DRILLING TOOL WITH THREAD PROFILE

(71) Applicant: HALLIBURTON ENERGY SERVICES, INC., Houston, TX (US)

(72) Inventors: Michael Dewayne Finke, Cypress, TX (US); Brian David Breaux, Houston, TX (US); Svetozar D. Simeonov, Houston, TX (US)

(73) Assignee: Halliburton Energy Service, Inc., Houston, TX (US)

( * ) Notice: Subject to any disclaimer, the term of this patent is extended or adjusted under 35 U.S.C. 154(b) by 383 days.

(21) Appl. No.: 16/458,151

(22) Filed: Jun. 30, 2019

(65) Prior Publication Data

US 2020/0408051 A1 Dec. 31, 2020

(51) Int. Cl.
| | |
|---|---|
| *E21B 17/16* | (2006.01) |
| *E21B 49/00* | (2006.01) |
| *E21B 17/10* | (2006.01) |
| *E21B 47/12* | (2012.01) |
| *G01V 1/52* | (2006.01) |
| *E21B 47/01* | (2012.01) |

(52) U.S. Cl.
CPC .......... *E21B 17/16* (2013.01); *E21B 17/1021* (2013.01); *E21B 47/01* (2013.01); *E21B 47/12* (2013.01); *E21B 49/00* (2013.01); *G01V 1/52* (2013.01)

(58) Field of Classification Search
CPC ...... E21B 17/16; E21B 17/1021; E21B 47/01; E21B 47/12; E21B 49/00; G01V 1/52
See application file for complete search history.

(56) References Cited

U.S. PATENT DOCUMENTS

| | | | |
|---|---|---|---|
| 6,447,025 B1 * | 9/2002 | Smith | .................. E21B 17/042 285/333 |
| 6,839,000 B2 | 1/2005 | Das et al. | |
| 7,367,394 B2 | 5/2008 | Willareal et al. | |
| 7,497,254 B2 | 3/2009 | Hall et al. | |
| 7,669,671 B2 | 3/2010 | Hall et al. | |
| 8,033,330 B2 | 10/2011 | Hall et al. | |

(Continued)

FOREIGN PATENT DOCUMENTS

| | | |
|---|---|---|
| CN | 101892813 A | 11/2010 |
| CN | 102839969 A | 12/2012 |

(Continued)

OTHER PUBLICATIONS

International Search Report and Written Opinion for International application No. PCT/US2019/040032, dated Mar. 31, 2020, 14 pages.

*Primary Examiner* — Yong-Suk (Philip) Ro
(74) *Attorney, Agent, or Firm* — Polsinelli PC

(57) ABSTRACT

A drilling tool for use in a wellbore comprises a first collar having a first bore extending from a first send to a second end and an internal thread disposed on the bore at the second end. The drilling tool also comprises a second collar having a second bore extending from a third end to a fourth end and an external thread disposed on the third end. The third end is coupled to the second end of the first collar. A first set of components is housed within the first bore and a second set of components is housed on a sidewall of the second collar formed between the second bore and an outer surface of the second collar.

29 Claims, 6 Drawing Sheets

(56) References Cited

U.S. PATENT DOCUMENTS

| | | |
|---|---|---|
| 8,091,627 B2 | 1/2012 | Hall et al. |
| 8,201,645 B2 | 6/2012 | Hall et al. |
| 8,307,703 B2 | 11/2012 | Moake |
| 9,158,031 B2 | 10/2015 | Moake |
| 9,187,964 B2 | 11/2015 | Harms |
| 2002/0075114 A1 | 6/2002 | Hall et al. |
| 2005/0016769 A1* | 1/2005 | Wallace ............... E21B 17/028 175/40 |
| 2008/0202742 A1 | 5/2008 | Hall et al. |
| 2008/0230218 A1 | 9/2008 | Hall et al. |
| 2010/0300677 A1 | 12/2010 | Patterson, III et al. |
| 2013/0075163 A1 | 3/2013 | Harms |
| 2014/0102714 A1 | 4/2014 | Villareal et al. |
| 2017/0037685 A1 | 2/2017 | Strachan |
| 2017/0306709 A1 | 10/2017 | Cull et al. |

FOREIGN PATENT DOCUMENTS

| | | |
|---|---|---|
| CN | 103321584 A | 9/2013 |
| CN | 204002753 U | 12/2014 |
| CN | 104514499 A | 4/2015 |
| WO | 2001011182 A1 | 2/2001 |
| WO | 2016108819 A1 | 7/2016 |

\* cited by examiner

DETAIL AA

DRILLING TOOL WITH THREAD PROFILE

TECHNICAL FIELD

The present disclosure relates generally to drilling tools used in a wellbore system. In at least one example, the present disclosure relates to component(s) housed in one or more collar(s) in which at least one of the collars has an increased inner diameter due to a unique internal thread design.

BACKGROUND

Wellbores are drilled into the earth for a variety of purposes including accessing hydrocarbon bearing formations. A variety of downhole tools can be used within a wellbore in connection with accessing and extracting such hydrocarbons. Components such as sensors, circuit boards, hardware, or the like, can measure, record, store, and/or pass along data related to drilling parameters to the surface (e.g., by telemetry or wired pipe). Conventionally, such components may be housed in one or more collars by arranging such components linearly along a length of the color. As a number of components increases, a length required to house the components also increases, thereby resulting in increased manufacturing and transport costs.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which.

DETAILED DESCRIPTION

Figure 1:
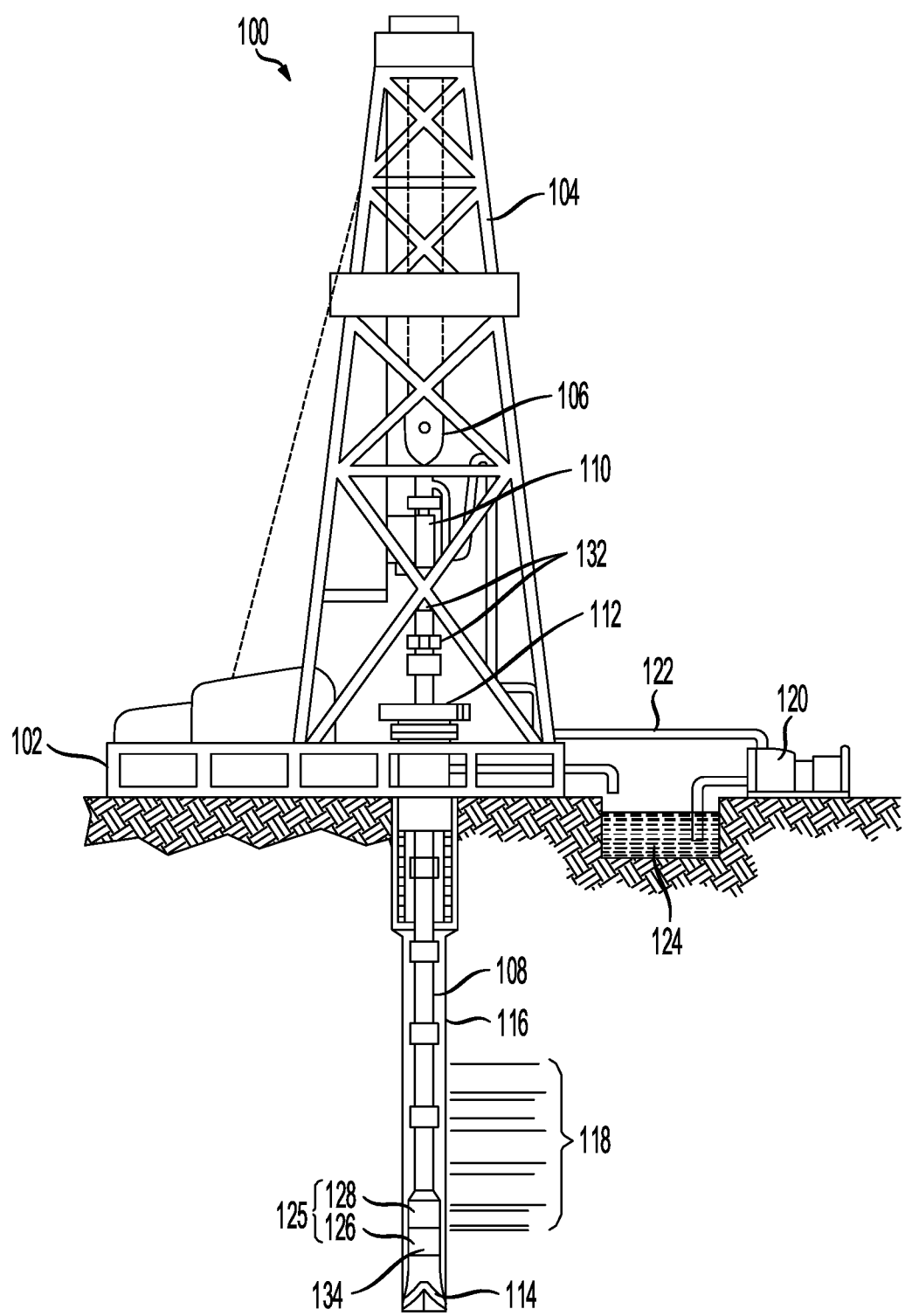
FIG. 1 is a schematic diagram of an example logging while drilling (LWD) wellbore operating environment, in accordance with some examples.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

According to at least one aspect, an example drilling tool is provided and can include any or all of the following features. The drilling tool can include a first collar and a second collar, each having a respective bore for housing components and/or for receiving drilling fluids during drilling. The first collar can include a unique internal thread disposed at an end of the first collar that results in a larger inner diameter of the first collar, thereby allowing for housing of more components in a shortened first collar. The drilling tool may include a pressure sleeve to protectively house sensors, circuit boards, and/or controllers disposed on the second collar that may be delicate and sensitive to the drilling environment, and a torque sleeve also disposed on the second collar and configured to provide axial pressure to the pressure sleeve. An overall length of the drilling tool may be reduced, due to packaging of more components in the first collar and/or the second collar, thereby reducing the amount of materials (and cost) required for the drilling tool and enabling positioning of all components in an optimized location.

As follows, the disclosure will provide a more detailed description of the systems herein for a drilling tool. The disclosure will begin with a description of an example environment, as shown in FIG. 1, which illustrates a schematic view of a logging while drilling (LWD) wellbore operating environment 100 in accordance with some examples of the present disclosure. As depicted in FIG. 1, a drilling platform 102 can be equipped with a derrick 104 that supports a hoist 106 for raising and lowering a drill string 108. The hoist 106 suspends a top drive 110 suitable for rotating and lowering the drill string 108 through a well head 112. A drill bit 114 can be connected to the lower end of the drill string 108. As the drill bit 114 rotates, the drill bit 114 creates a wellbore 116 that passes through various formations 118. A pump 120 circulates drilling fluid through a supply pipe 122 to top drive 110, down through the interior of drill string 108 and orifices in drill bit 114, back to the surface via the annulus around drill string 108, and into a retention pit 124. The drilling fluid transports cuttings from the wellbore 116 into the retention pit 124 and aids in maintaining the integrity of the wellbore 116. Various materials can be used for drilling fluid, including oil-based fluids and water-based fluids.

Logging tools 126 can be integrated into the bottom-hole assembly 125 near the drill bit 114. As the drill bit 114 extends the wellbore 116 through the formations 118, logging tools 126 collect measurements relating to various formation properties as well as the orientation of the tool and various other drilling conditions. The bottom-hole assembly 125 may also include a telemetry sub 128 to transfer measurement data to a surface receiver 132 and to receive commands from the surface. In at least some cases, the telemetry sub 128 communicates with a surface receiver 132 using mud pulse telemetry. In some instances, the telemetry sub 128 does not communicate with the surface, but rather stores logging data for later retrieval at the surface when the logging assembly is recovered.

Each of the logging tools 126 may include one or more tool components spaced apart from each other and communicatively coupled with one or more wires and/or other media. The logging tools 126 may also include one or more computing devices 134 communicatively coupled with one or more of the one or more tool components by one or more wires and/or other media. The one or more computing devices 134 may be configured to control or monitor a performance of the tool, process logging data, and/or carry out one or more aspects of the methods and processes of the present disclosure.

In at least some instances, one or more of the logging tools 126 may communicate with a surface receiver 132 by a wire, such as wired drillpipe. In other cases, the one or more of the logging tools 126 may communicate with a surface receiver 132 by wireless signal transmission. In at least some cases, one or more of the logging tools 126 may receive electrical power from a wire that extends to the surface, including wires extending through a wired drillpipe.

Figure 2:
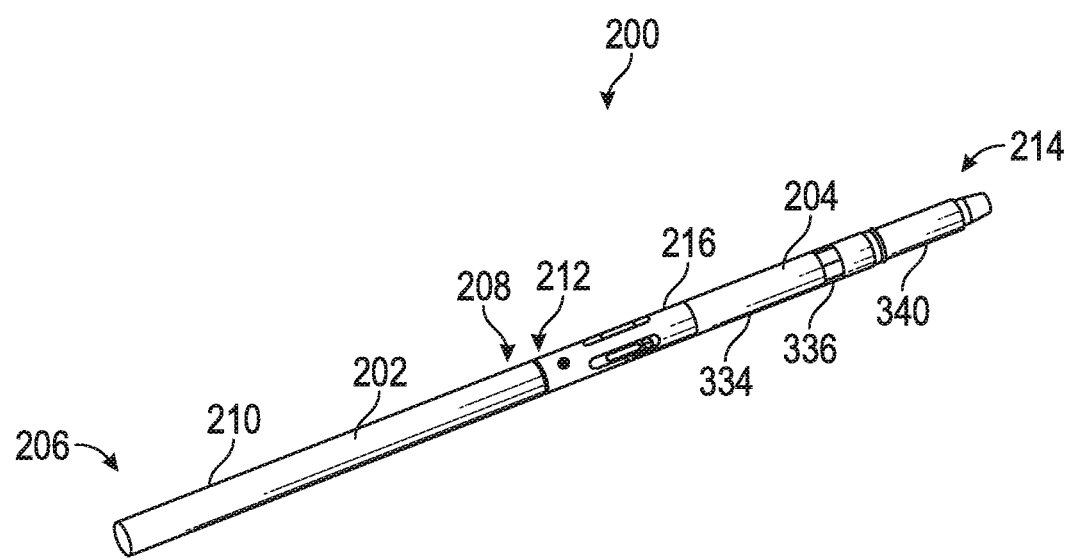
FIG. 2 is a front view of an example drilling tool that can be used in the environment shown in FIG. 1.

FIG. 2 is a schematic diagram of an example drilling tool 200 that can be used in the environment shown in FIG. 1. The drilling tool 200 can be positioned anywhere on the drill string 108 such as, but not limited to, above the drill bit 114 and may comprise the bottom hole assembly 125 and/or the logging tools 126 of FIG. 1. As shown, the drilling tool 200 includes a first collar 202 and a second collar 204, though in other examples the drilling tool 200 can have any number of collars such as one, two, or more than two collars.

Figure 3:
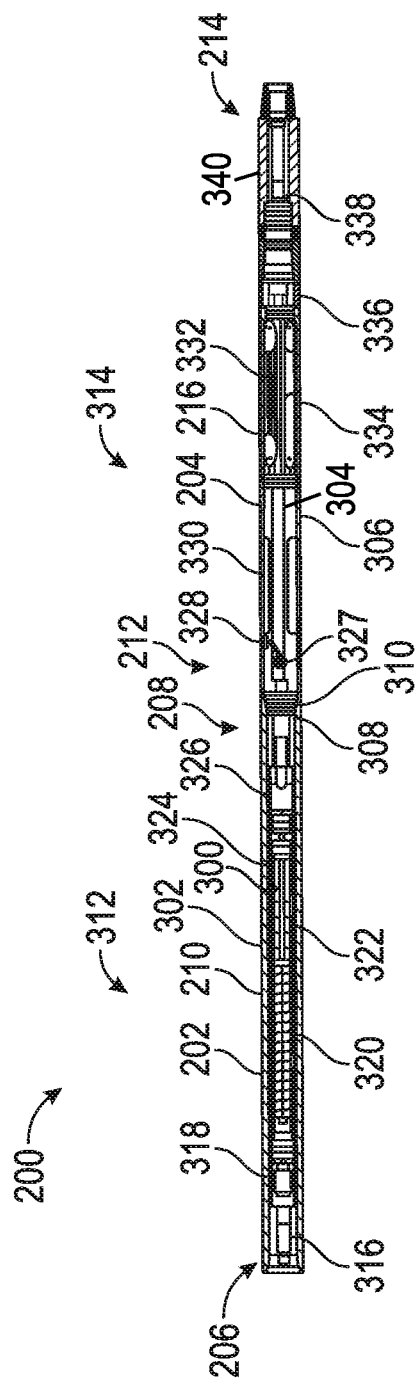
FIG. 3 is a cross-section of the drilling tool shown in FIG. 2.

Referring to FIG. 3, the first collar 202 includes a first bore 300 extending from a first end 206 to a second end 208 and a first sidewall 302 formed between the first bore 300 and a first outer surface 210. The second collar 202 includes a second bore 304 extending from a third end 212 to a fourth end 214 and a second sidewall 306 formed between the second bore 304 and a second outer surface 216. Each of the first bore 300 and the second bore 304 may receive drilling fluid during drilling.

In one aspect, each of the first end 206, the second end 208, the third end 212, and the fourth end 214 can be threaded or smooth, can have an external thread or an internal thread, and/or can be a female fitting or a male fitting. As shown in FIG. 3, the second end 208 includes an internal thread 308, described in more detail with respect to FIG. 5, and the third end 212 includes an external thread 310. The internal thread 308 is unique because an inner diameter of the first collar 202 may be greater than conventional collars while maintaining integrity of the first collar 202 to withstand stresses and bending moments experienced during drilling. Such greater inner diameter increases a volume of the first bore 300, thereby providing for room to house more components than a conventionally sized bore and effectively reducing a length of the drilling tool 200. In one specific example, a length of the drilling tool 200 may be substantially between 12' to 15', though the range given may vary or differ in other example embodiments described herein.

More specifically, as shown in FIG. 3, which illustrates a cross-section of the drilling tool 200 shown in FIG. 2, a first set of components 312 is housed within the first bore 300 and a second set of components 314 is housed within the second sidewall 306. In the example shown, the first set of components 312 may include a first interconnect 316 at the first end 206. The first interconnect 316 can electrically and/or mechanically connect the first set of components 312 to other components of the drilling tool 200 and/or components of an adjacent drilling tool. As shown, the first interconnect 316 may be electrically coupled to an energy module 318.

The energy module 318 may be configured to provide power to the first set of components 312 and/or the second set of components 314 by a set of one or more batteries or capacitors. In other examples, the first set of components 312 may not include the energy module 318 and, in some examples, a non-live (e.g., dummy) module can be positioned near the first interconnect 316 in place of the energy module 318 to maintain a structural integrity of the first collar 202.

In the illustrated example shown in FIG. 3, the first set of components may further include a directional module 320 disposed near the energy module 318 or the interconnect 316 if the energy module 318 is not included. The directional module 320 is configured to obtain directional measurements (i.e., inclination, azimuth, temperature, etc.). Such measurements may be recorded and stored for future retrieval or transmitted to the surface of the wellbore 116 (as shown in FIG. 1) by telemetry or wired pipe. In the example shown, the directional module 320 is, aside from the energy module 318, positioned furthest away from the drill bit 114 (as shown in FIG. 1) to avoid interference from the drill bit 114 that may be detrimental to the directional module's 320 ability obtain accurate measurement data.

As shown, the first set of components 312 may further include a bus 322 for transferring data between components of the first set of components 312 and/or the second set of components 314. In one aspect, the bus 322 may be interchangeable with the first set of components 312 and the second set of components 314 and may be positioned in either the first bore 300, in a recessed pocket in the second sidewall 306 of the second collar 204, or elsewhere on or within the second sidewall 306.

As shown, the first set of components 312 may further include a pressure module 324 disposed near the bus for measuring pressure while drilling. Such measurements may be recorded and stored for future retrieval or transmitted to the surface of the wellbore 116 (as shown in FIG. 1) by telemetry or wired pipe. In one aspect, the pressure module 324 may be interchangeable between the first set of components 312 and the second set of components 314 and in other examples, may be positioned anywhere in the first bore 300 and/or the second bore 304.

The first set of components 312 also includes a flow diverter 326 disposed near the second end 208. The flow diverter 326 is configured to direct a flow of the drilling fluid that is circulated during drilling around the first set of components 312. In one example, the flow diverter 326 directs a flow of the drilling fluid around the pressure module 324, the bus 322, the directional module 320, and the energy module 318, toward the second bore 304. In other examples, the flow diverter 326 can direct flow around the directional module 320 toward the second bore 304.

The second set of components 314 may include a weight and torque sensor 327 for measuring a weight on bit and a torque on bit. Such measurements may be recorded and stored for future retrieval or transmitted to the surface of the wellbore 116 (as shown in FIG. 1) by telemetry or wired pipe. As shown, the weight and torque sensor 327 is positioned on the second sidewall 306 near the third end 212, though the weight and torque sensor 327 may be positioned elsewhere on the second sidewall 306, on the first sidewall 302 or in the first bore 300.

The second set of components 314 may also include a connector 328 disposed in the second sidewall 306 and may be communicatively coupled to the first set of components 312 and the second set of components 314. In other examples, the connector 328 may be disposed anywhere in the first sidewall 302 or positioned elsewhere on the second sidewall 306. The connector 328 is configured to couple with an external device to receive or send data, controls, and/or instructions. The connector 328 is also configured to couple with a power source (if needed) to provide temporary power to the second set of components 314 and the first set of components 312.

The second set of components 314 may also include an imager 330 for obtaining images of the wellbore 116 (as shown in FIG. 1). Such images may be used to visually analyze the wellbore 116. The imager 330 may be disposed on the second sidewall 306 near the third end 212, though in other examples the imager 330 may be disposed near a center of the second collar 204 or the fourth end 214. The imager 330 may also include a caliper for measuring a size and a shape of the wellbore 116, though in some examples the caliper may be separate from the imager or may not be included in the drilling tool 200.

In the illustrated example, the second set of components 314 may also include a gamma module 332 disposed near the fourth end 214. The gamma module 332 is configured to measure formation properties of the wellbore 116 (as shown in FIG. 1). Such measurements may be recorded and stored for future retrieval or transmitted to the surface of the wellbore 116 by telemetry or wired pipe. The gamma module 332 is disposed in a recessed pocket of the second sidewall 306, though the gamma module 332 may be positioned elsewhere on the second sidewall 306 in other examples.

As shown, the drilling tool 200 may further comprise a pressure sleeve 334 disposed over a portion of the second collar 204 and the gamma module 332. In other examples, the pressure sleeve 334 may be disposed over sensors, controllers, circuit boards, or the like. The drilling tool 200, in the illustrated example, further includes a torque sleeve 336 disposed over a portion of the second collar 204 and adjacent to the pressure sleeve 334. A lock sub 340 is positioned adjacent to the torque sleeve 336. The lock sub 340 is configured to apply axial pressure to the torque sleeve 336 and pressure sleeve 334.

As shown, the second set of components 216 includes a second interconnect 338 for mechanically and/or electrically coupling the second set of components 314 to an adjacent drilling tool. The second interconnect 338 is disposed at the fourth end 214 of the second collar 204. In the illustrated example, the second interconnect 338 is an electrical pin for communicatively coupling to an adjacent drilling tool.

It will be appreciated that any of the first set of components 312 and/or the second set of components 314 may be replaced by a non-live (e.g. dummy) version of the component. Such non-live component may protect a connection of the component from being exposed to the drilling environment and/or provide a placeholder for one of the components so that a structural integrity of the first collar 202 and/or the second collar 204 is not compromised. It will also be appreciated that wiring may be disposed in the first collar 202 and/or the second collar 204 to communicatively couple the first set of components 312, the second set of components 314, another set of components, and/or components at the surface of the wellbore 116 (as shown in FIG. 1) to each other. Further, any measurements described may be recorded and stored for future retrieval or transmitted to the surface of the wellbore 116 while drilling by telemetry or wired pipe.

Figure 4:
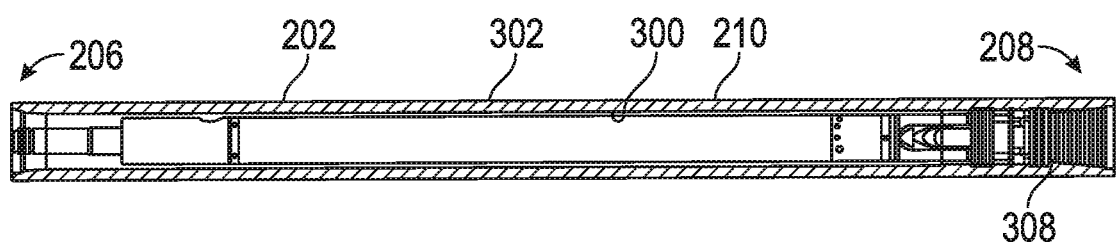
FIG. 4 is a cross-section of a first collar of the drilling tool shown in FIG. 2, with components of the first collar removed for clarity
Figure 5A:
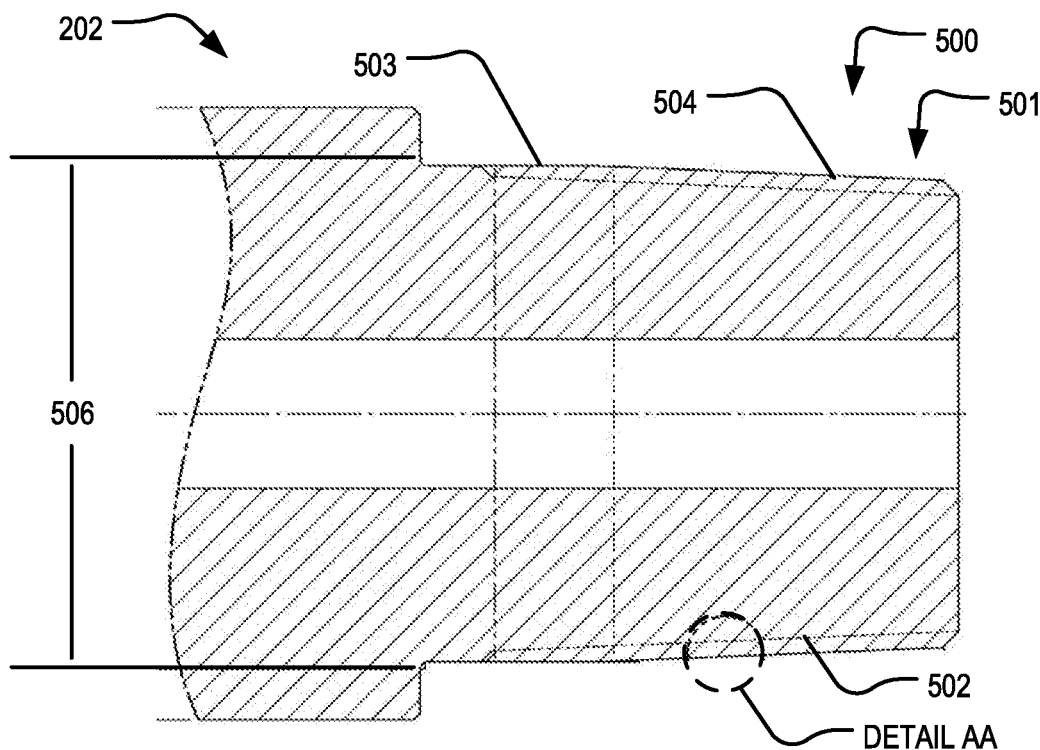
FIGS. 5A-5B are a cross-section of an example pin connector and an example box connector, respectively.
Figure 5B:
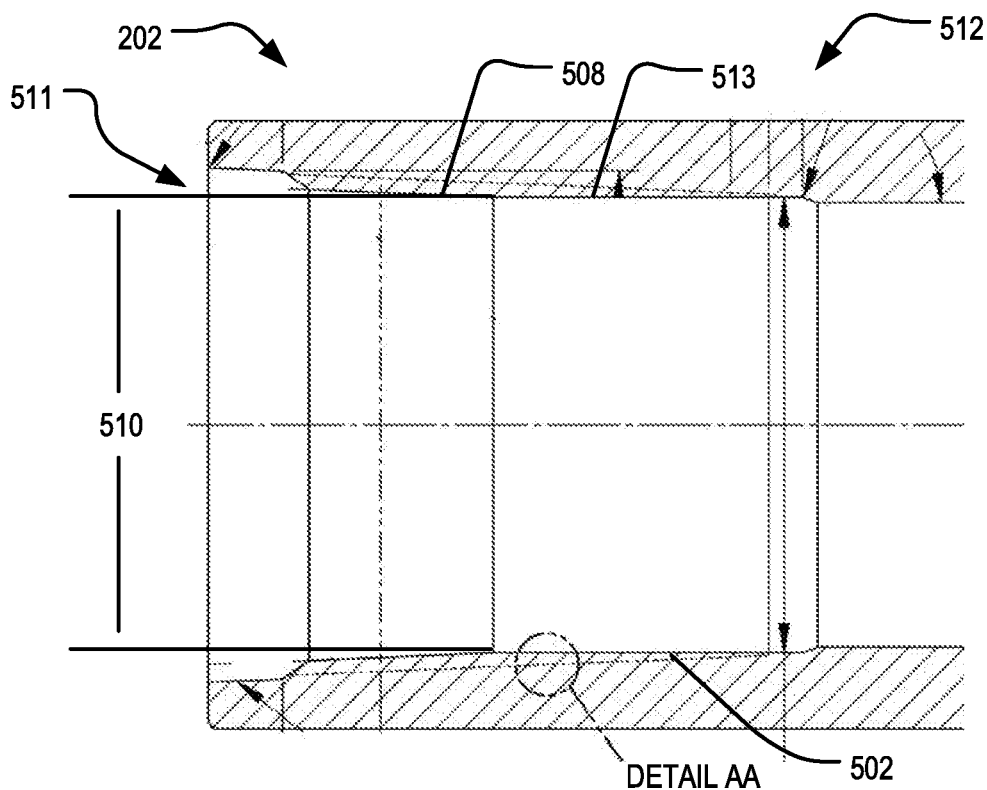

Turning to FIGS. 4 and 5A-5B, cross-sections of the first collar 202 without the components, an example pin end connection 500, and an example box end connection 512 are respectively shown. The pin end connection 500 and/or the box end connection 512 may be disposed on any of the first end 206, the second end 208, the third end 212, or the fourth end 214. The pin end connection 500 includes a pin 501 having a tapered surface 504 extending to a cylindrical surface 503. In the illustrated example, an external thread 502 is disposed on the tapered surface 504 and the cylindrical surface 503, though in other examples, the thread 502 may be disposed on a portion, none, or all of the tapered surface 504 and/or on a portion, none, or all of the cylindrical surface 503. The pin 501 also includes an outer diameter 506. The outer diameter 506 may be larger than a diameter of a conventional pin end connection and the tapered surface 504 may include a taper smaller than a taper of a conventional pin end connection. Such larger outer diameter 506 and reduced tapered surface 504 may increase a section modulus of the pin end connection 500 compared to a conventional pin end connection.

The box end connection 512 includes a bore 511 sized and shaped to receive the pin 501. The bore 511 includes a tapered surface 508 extending to a cylindrical surface 513 and complementary shaped to the tapered surface 502 and the cylindrical surface 503. In the illustrated example, an internal thread 502 is disposed on the tapered surface 508 and the cylindrical surface 513, though in other examples, the thread 502 may be disposed on a portion, none, or all of the tapered surface 508 and/or on a portion, none, or all of the cylindrical surface 513. The bore 511 also includes an inner diameter 510. The inner diameter 510 may be larger than a diameter of a conventional box end connection and the tapered surface may include a taper smaller than a taper of a conventional box end connection. Such larger inner diameter 510 beneficially allows for components of a larger diameter to be disposed in the first collar 202 and/or for components to be disposed side-by-side within the first collar 202. To enable a collar with a larger inner diameter, the thread 502 includes a unique thread profile that increases a fatigue bending capacity of the first collar 202.

Figure 6:
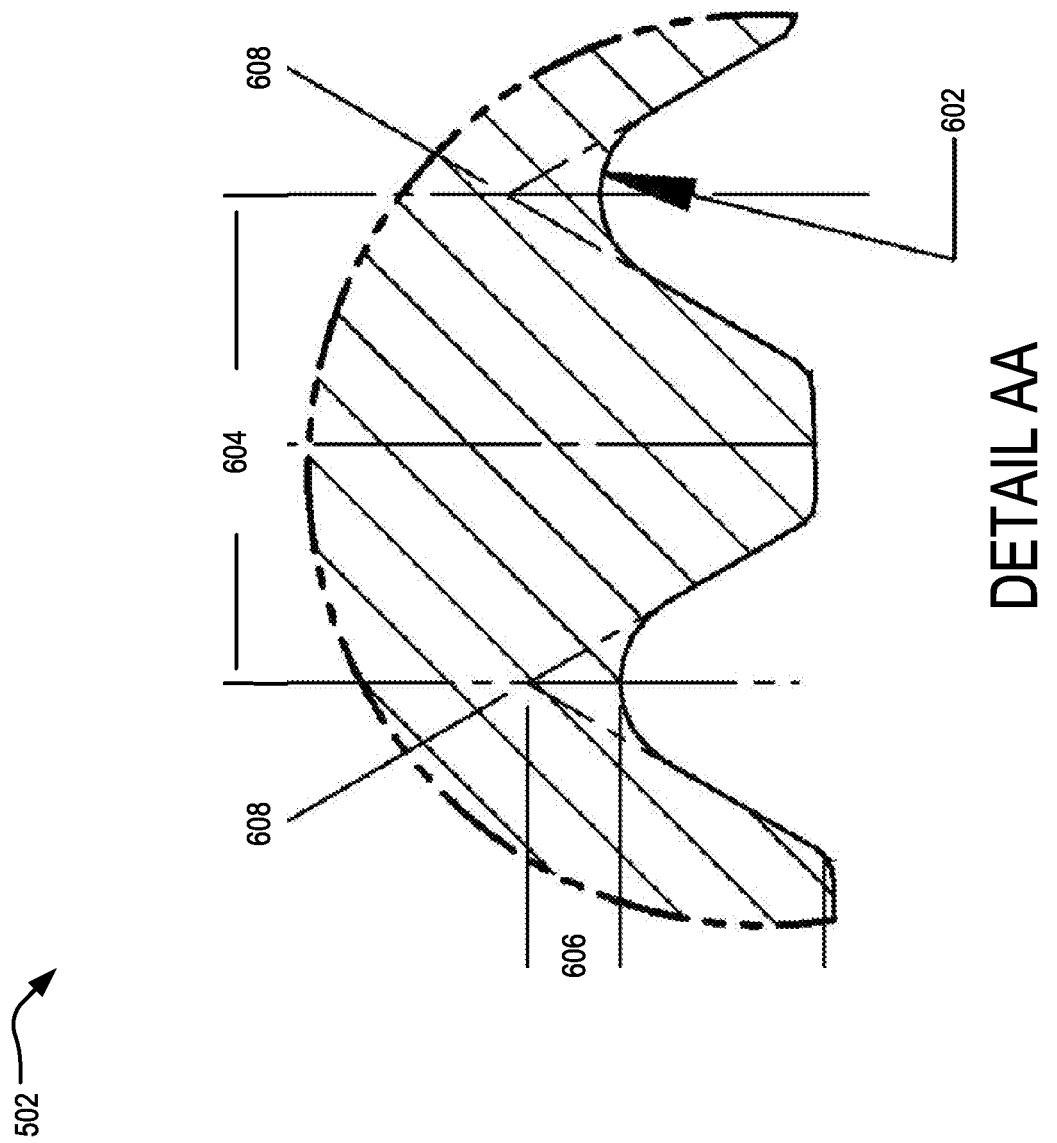
FIG. 6 is a cross-section of an example thread profile that can be used on the drilling tool shown in FIG. 2.

FIG. 6 illustrates a cross-section of an example thread profile 502. The thread profile 502 may be disposed at any of the first end 206, the second end 208, the third end 212, or the fourth end 214. The thread profile 502 includes a thread pitch 604 defined by a distance between thread points 608 and a root radius 602 formed at each thread pitch 604. Such root radius 602 and corresponding thread point 608 defines a thickness 606. The thread pitch 604 may be larger than conventional thread pitches, and thread points 608 may be spaced further apart from each other. As such, each thread point 608 may have wider thickness, thereby enabling a larger root radius 602, and thus, larger thickness 606 to be formed at the thread point 608. The larger root radius 602 may increase a fatigue bending capacity of the first collar 202. The larger inner diameter 300 of the first collar 202 and internal volume of the first collar 202 allow an increased volume and for more components to be housed in the first collar 202, thereby decreasing an overall length of the drilling tool 200.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the above description, terms such as "upper," "upward," "lower," "downward," "above," "below," "downhole," "uphole," "longitudinal," "lateral," and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool. Additionally, the illustrate embodiments are illustrated such that the orientation is such that the right-hand side is downhole compared to the left-hand side.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicate that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder.

The term "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Moreover, claim language reciting "at least one of" a set indicates that one member of the set or multiple members of the set satisfy the claim. For example, claim language reciting "at least one of A and B" means A, B, or A and B.

Statements of the disclosure include:

Statement 1: A drilling tool for use in a wellbore, the drilling tool comprising: a first collar having a first bore extending from a first end to a second end and an internal thread disposed on the bore at the second end, the thread having a thread pitch and a root radius disposed at a thread point; a second collar having a second bore extending from a third end to a fourth end, the third end of the second collar having an external thread and coupled to the first collar at the second end, the second collar comprising a sidewall formed between the second bore and an outer surface of the second collar; a first set of components housed within the first bore, the first set of components including at least one of a first interconnect disposed near the first end for electrically coupling the first set of components to other components of the drilling tool, a directional module for obtaining directional measurements disposed near the first interconnect, and a flow diverter for directing a flow of a drilling liquid disposed near the second end; and a second set of components housed on the sidewall of the second collar, the second set of components including at least one of a weight and torque sensor for measuring weight on bit and torque, an imager for obtaining images of the wellbore, and a gamma module for measuring formation properties disposed near the fourth end.

Statement 2: A drilling tool according to Statement 1, wherein a length of the drilling tool is between 12' to 15'.

Statement 3: A drilling tool according to any of Statements 1 or 2, wherein the first collar further comprises a sidewall formed between the first bore and an outer surface of the first collar.

Statement 4: A drilling tool according to any of Statements 1 through 3, wherein the first set of components includes a bus for transferring data between the components of the first set of components and the second set of components.

Statement 5. The drilling tool of Statements 1 through 4, wherein the second set of components includes a bus for transferring data between the components of the first set of components and the second set of components.

Statement 6. The drilling tool of Statements 1 through 5, wherein the first set of components includes an energy module for providing power to the first set of components and the second set of components.

Statement 7. The drilling tool of Statements 1 through 6, wherein the first set of components includes a pressure module for measuring pressure while drilling.

Statement 8. The drilling tool of Statements 1 through 7, wherein the second set of components includes a pressure module for measuring pressure while drilling.

Statement 9. The drilling tool of Statements 1 through 8, wherein the drilling tool further comprises a pressure sleeve disposed over a portion of the second collar and the gamma module.

Statement 10. The drilling tool of Statements 1 through 9, wherein the drilling tool further comprises a torque sleeve disposed over a portion of the second collar and adjacent to the pressure sleeve and a lock sub, the lock sub configured to apply axial pressure to the torque sleeve and pressure sleeve.

Statement 11. The drilling tool of Statements 1 through 10, wherein the second collar further comprises a second interconnect for communicatively coupling the drilling tool to an adjacent drilling tool.

Statement 12. The drilling tool of Statements 1 through 11, wherein the second set of components includes a connector disposed in the sidewall of the second collar and communicatively coupled to the first set of components and the second set of components, the connector coupling with at least one of an external device and a power source.

Statement 13. The drilling tool of Statements 1 through 12, wherein the first set of components includes a connector disposed in the sidewall of the second collar and communicatively coupled to the first set of components and the second set of components, the connector coupling with at least one of an external device and a power source.

Statement 14. The drilling tool of Statements 1 through 13, wherein the flow diverter transitions the flow of the drilling liquid from the first bore to the second bore.

Statement 15. A drilling tool of a drill-string disposed in a well for drilling, the drilling tool comprising a first collar having a first bore extending from a first end to a second end and an internal thread disposed on the bore at the second end, the thread having a thread pitch and a root radius disposed at a thread point; a second collar having a second bore extending from a third end to a fourth end, the third end of the second collar coupled to the first collar at the second end, the second collar comprising a sidewall formed between the second bore and an outer surface of the second collar; a first set of components housed in the first bore; and a second set of components housed in the second bore.

Statement 16. The drilling tool of Statement 15, wherein a length of the drilling tool is between 12' to 15'.

Statement 17. The drilling tool of Statements 15 through 16, wherein the first set of components includes at least one of a first interconnect disposed near the first end for electrically coupling the first set of components to other components of the drilling tool, a directional module disposed near the energy module for obtaining directional measurements, and a flow diverter disposed near the second end for directing a flow of a drilling liquid.

Statement 18. The drilling tool of Statements 15 through 17, wherein the flow diverter transitions the flow of the drilling liquid from the first bore to the second bore.

Statement 19. The drilling tool of Statements 15 through 18, wherein the first set of components includes an energy module for providing energy to the first set of components and the second set of components.

Statement 20. The drilling tool of Statements 15 through 19, wherein the first set of components includes a bus for transferring data between the components of the first set of components and the second set of components.

Statement 21. The drilling tool of Statements 15 through 20, wherein the bus is interchangeable between the first set of components and the second set of components.

Statement 22. The drilling tool of Statements 15 through 21, wherein the first set of components includes a pressure module for measuring pressure while drilling.

Statement 23. The drilling tool of Statements 15 through 22, wherein the second set of components includes at least one of a weight and torque sensor for measuring weight on bit and torque, an imager for obtaining images of the wellbore, and a gamma module for measuring formation properties disposed near the fourth end.

Statement 24. The drilling tool of Statements 15 through 23, wherein the drilling tool further comprises a pressure sleeve disposed over a portion of the second collar and the gamma module.

Statement 25. The drilling tool of Statements 15 through 24, wherein the drilling tool further comprises a torque sleeve disposed over a portion of the second collar and adjacent to the pressure sleeve and a lock sub, the lock sub configured to apply axial pressure to the pressure sleeve and the torque sleeve.

Statement 26. The drilling tool of Statements 15 through 25, wherein the second collar further comprises a second interconnect for communicatively coupling the drilling tool to an adjacent drilling tool.

Statement 27. The drilling tool of Statements 15 through 26, wherein the second set of components includes a connector disposed in the sidewall of the second collar and communicatively coupled to the first set of components and the second set of components, the connector coupling with at least one of an external device and a power source.

Statement 28. The drilling tool of Statements 15 through 27, wherein the second set of components includes a bus for transferring data between the components of the first set of components and the second set of components.

Statement 29. The drilling tool of Statements 15 through 28, wherein the second set of components includes a pressure module for measuring pressure while drilling.

What is claimed is:

1. A drilling tool for use in a wellbore, the drilling tool comprising:
    a first collar having a first bore extending from a first end to a second end and an internal thread disposed on the bore at the second end, the thread having a thread pitch and a root radius disposed at a thread point;
    a second collar having a second bore extending from a third end to a fourth end, the third end of the second collar having an external thread and coupled to the first collar at the second end, the second collar comprising a sidewall formed between the second bore and an outer surface of the second collar;
    a first set of components housed within the first bore, the first set of components including at least one of a first interconnect disposed near the first end for electrically coupling the first set of components to other components of the drilling tool, a directional module for obtaining directional measurements disposed near the first interconnect, and a flow diverter for directing a flow of a drilling liquid disposed near the second end; and
    a second set of components housed on the sidewall of the second collar, the second set of components including at least one of a weight and torque sensor for measuring weight on bit and torque, an imager for obtaining images of the wellbore, and a gamma module for measuring formation properties disposed near the fourth end.

2. The drilling tool of claim 1, wherein a length of the drilling tool is between 12' to 15'.

3. The drilling tool of claim 1, wherein the first collar further comprises a sidewall formed between the first bore and an outer surface of the first collar.

4. The drilling tool of claim 1, wherein the first set of components includes a bus for transferring data between the components of the first set of components and the second set of components.

5. The drilling tool of claim 1, wherein the second set of components includes a bus for transferring data between the components of the first set of components and the second set of components.

6. The drilling tool of claim 1, wherein the first set of components includes an energy module for providing power to the first set of components and the second set of components.

7. The drilling tool of claim 1, wherein the first set of components includes a pressure module for measuring pressure while drilling.

8. The drilling tool of claim 1, wherein the second set of components includes a pressure module for measuring pressure while drilling.

9. The drilling tool of claim 1, wherein the drilling tool further comprises a pressure sleeve disposed over a portion of the second collar and the gamma module.

10. The drilling tool of claim 9, wherein the drilling tool further comprises a torque sleeve disposed over a portion of the second collar and adjacent to the pressure sleeve and a lock sub, the lock sub configured to apply axial pressure to the torque sleeve and pressure sleeve.

11. The drilling tool of claim 1, wherein the second collar further comprises a second interconnect for communicatively coupling the drilling tool to an adjacent drilling tool.

12. The drilling tool of claim 1, wherein the second set of components includes a connector disposed in the sidewall of the second collar and communicatively coupled to the first set of components and the second set of components, the connector coupling with at least one of an external device and a power source.

13. The drilling tool of claim 1, wherein the first set of components includes a connector disposed in the sidewall of the second collar and communicatively coupled to the first set of components and the second set of components, the connector coupling with at least one of an external device and a power source.

14. The drilling tool of claim 1, wherein the flow diverter transitions the flow of the drilling liquid from the first bore to the second bore.

15. A drilling tool of a drill-string disposed in a well for drilling, the drilling tool comprising:
a first collar having a first bore extending from a first end to a second end and an internal thread disposed on the bore at the second end, the thread having a thread pitch and a root radius disposed at a thread point;
a second collar having a second bore extending from a third end to a fourth end, the third end of the second collar coupled to the first collar at the second end, the second collar comprising a sidewall formed between the second bore and an outer surface of the second collar;
a first set of components housed in the first bore, wherein the first set of components includes at least one of a first interconnect disposed near the first end for electrically coupling the first set of components to other components of the drilling tool, a directional module disposed near an energy module for obtaining directional measurements, and a flow diverter disposed near the second end for directing a flow of a drilling liquid; and
a second set of components housed in the second bore.

16. The drilling tool of claim 15, wherein a length of the drilling tool is between 12' to 15'.

17. The drilling tool of claim 15, wherein the flow diverter transitions the flow of the drilling liquid from the first bore to the second bore.

18. The drilling tool of claim 15, wherein the first set of components includes an energy module for providing energy to the first set of components and the second set of components.

19. The drilling tool of claim 15, wherein the first set of components includes a bus for transferring data between the components of the first set of components and the second set of components.

20. The drilling tool of claim 19, wherein the bus is interchangeable between the first set of components and the second set of components.

21. The drilling tool of claim 15, wherein the first set of components includes a pressure module for measuring pressure while drilling.

22. The drilling tool of claim 15, wherein the second set of components includes at least one of a weight and torque sensor for measuring weight on bit and torque, an imager for obtaining images of a wellbore, and a gamma module for measuring formation properties disposed near the fourth end.

23. The drilling tool of claim 22, wherein the drilling tool further comprises a pressure sleeve disposed over a portion of the second collar and the gamma module.

24. The drilling tool of claim 22, wherein the drilling tool further comprises a torque sleeve disposed over a portion of the second collar and adjacent to a pressure sleeve and a lock sub, the lock sub configured to apply axial pressure to the pressure sleeve and the torque sleeve.

25. The drilling tool of claim 22, wherein the second collar further comprises a second interconnect for communicatively coupling the drilling tool to an adjacent drilling tool.

26. The drilling tool of claim 15, wherein the second set of components includes a connector disposed in the sidewall of the second collar and communicatively coupled to the first set of components and the second set of components, the connector coupling with at least one of an external device and a power source.

27. The drilling tool of claim 26, wherein the second set of components includes a bus for transferring data between the components of the first set of components and the second set of components.

28. The drilling tool of claim 26, wherein the second set of components includes a pressure module for measuring pressure while drilling.

29. A drilling tool of a drill-string disposed in a well for drilling, the drilling tool comprising:
a first collar having a first bore extending from a first end to a second end and an internal thread disposed on the bore at the second end, the thread having a thread pitch and a root radius disposed at a thread point;
a second collar having a second bore extending from a third end to a fourth end, the third end of the second collar coupled to the first collar at the second end, the second collar comprising a sidewall formed between the second bore and an outer surface of the second collar;
a first set of components housed in the first bore; and
a second set of components housed in the second bore, wherein the second set of components includes at least one of a weight and torque sensor for measuring weight on bit and torque, an imager for obtaining images of a wellbore, and a gamma module for measuring formation properties disposed near the fourth end, and wherein the drilling tool further comprises a torque sleeve disposed over a portion of the second collar and adjacent to a pressure sleeve and a lock sub, the lock sub configured to apply axial pressure to the pressure sleeve and the torque sleeve.

* * * * *